April 4, 1961 M. A. THERIAULT 2,977,940
METHOD OF OPERATION OF INTERNAL COMBUSTION ENGINES
Filed Nov. 23, 1956
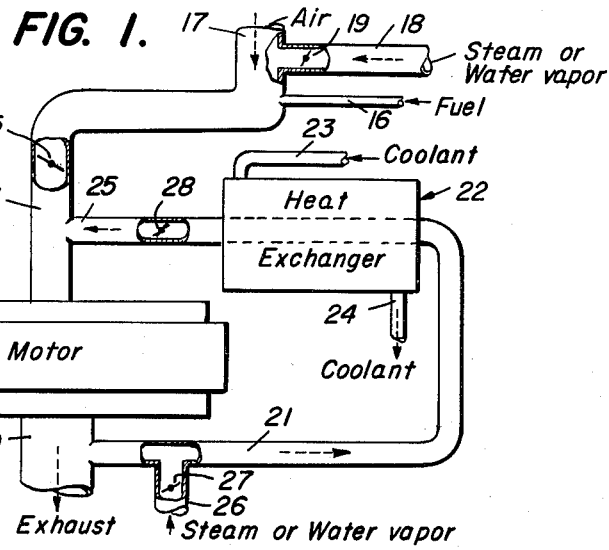
FIG. 1.
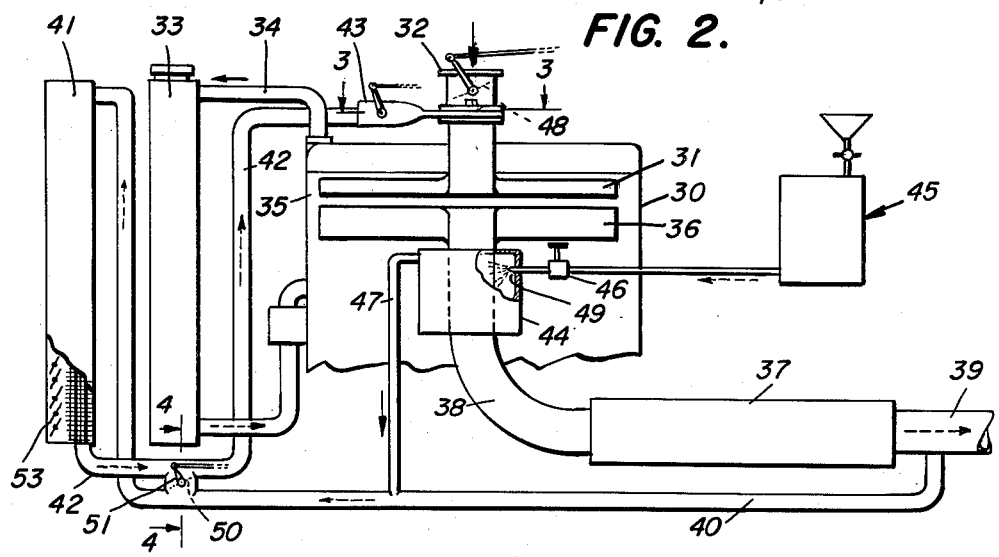
FIG. 2.
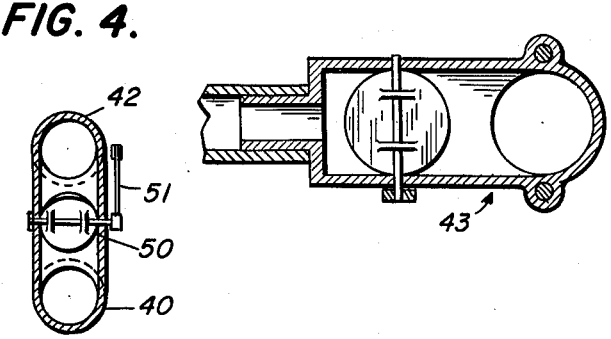
FIG. 3.
FIG. 4.
INVENTOR
MATTHEW A. THERIAULT
BY
ATTORNEY

United States Patent Office 2,977,940
Patented Apr. 4, 1961

2,977,940

METHOD OF OPERATION OF INTERNAL COMBUSTION ENGINES

Matthew A. Theriault, Rte. 2, Box 218, Thermal, Calif.

Filed Nov. 23, 1956, Ser. No. 623,878

4 Claims. (Cl. 123—25)

This invention relates to a method and means for the operation of an internal combustion engine.

It is well known that the introduction of small quantities of water into an internal combustion engine along with the intake fuel and combustion air improves the operation of an internal combustion engine in various ways, but in practice difficulty has always been encountered in introducing the proper amount of moisture for optimum performance under varying operating conditions. Introduction of small portions of the hot products of combustion along with the new fuel charge has also been used in attempts to effect better vaporization of the fuel, but this has also invariably led to uncontrolled effects upon the performance of the engine.

I have discovered that a portion of the exhaust gases from the engine, cooled to a temperature below the dew point, when added to the combustion charge of the motor, suppresses detonation, increases fuel efficiency, and produces a cleaner motor and exhaust. In practice, the optimum proportion of exhaust gases which may with benefit be recirculated to the motor varies with motor operation conditions. It is the gist of my invention that the returned gases be introduced into the new fuel stream at a temperature below the dew point, so that at least some of the water contained therein will be dispersed liquid water, that is, in the form of water as it occurs in atmospheric fog, suspended in the exhaust gases.

It is, therefore, an object of this invention to provide a method for operating an internal combustion motor in which water and exhaust combustion gases are introduced into the fuel system in a controlled manner and in a suitable physical state or condition which results in a marked improvement in the operation of the motor at all motor speeds. Another object is to provide a method for operating an internal combustion motor which gives greater power, better acceleration, a cooler and cleaner motor, better fuel efficiency, and which suppresses undesired detonation. Another object is to so humidify all or at least a portion of the air entering the motor that the portion of the exhaust gases returned to the fuel system may be lowered to the dew point by atmospheric air, evaporative water cooling, or other cooling means. A further object is to provide a combination of means associated with an internal combustion engine for attaining these objectives.

These and other objects are attained by my invention which will be understood from the following description, reference being made to the accompanying drawings in which:

Fig. 1 is a diagrammatic representation of as much of an internal combustion engine setup as is necessary to illustrate my method invention, and showing particularly the flow of fuel, air and exhaust gases;

Fig. 2 is a side elevational view partly in section of an automotive engine with auxiliary equipment arranged to utilize my invention;

Fig. 3 is a cross-sectional view taken on the line 3—3 of Fig. 2; and

Fig. 4 is a cross-sectional view taken on the line 4—4 of Fig. 2.

Referring to Fig. 1, an internal combustion motor block 11 of conventional type is provided with an intake manifold 12 and an exhaust manifold 13. The intake manifold 12 is connected to the fuel supply unit by an extension tube 14 which is provided with a conventional butterfly valve 15 operatively connected to a throttle (not shown) for regulating the amount of fuel charge going to the engine. The fuel is introduced (as in a conventional carburetor) into the manifold extension tube 14 through the fuel tube 16, and is mingled with the incoming fresh atmospheric air brought in through the air intake tube 17. The incoming air through the tube 17 may, if it is deficient in moisture (as will be more fully explained below), be humidified by the introduction of water vapor from any convenient source such as a steam generator, through the humidification tube 18, the amount of water vapor being controlled by a valve 19 in this tube.

The exhaust manifold 13 is extended by the pipe 20 which may lead to a muffler system (not shown), or the waste gases may be exhausted to the atmosphere. A combustion gas return pipe 21 is connected into the extension pipe 20 at any convenient position either before or after the muffler (if any) and is arranged to take out a portion, generally about one-fourth, of the exhaust combustion gases and carry it to a heat exchanger 22 where the exhaust gases are cooled to a temperature below the dew point, but not below the freezing point of water. The cooling fluid, which may be air or water, is, for example, brought in to the exchanger 22 and through the tube 23 and passes out through the exit pipe 24. The stream of returned exhaust gases, after leaving the heat exchanger 22, where it has been cooled below the dew point, is introduced through the pipe 25 into the intake manifold extension 14, preferably between the engine and the butterfly valve 15. The flow of the returned gas in the pipe 21, the heat exchanger 22 and the delivery pipe 25 may be regulated by a valve 28 if the suction of the motor is sufficient or the valve 28 may be in the form of a positive injection pump whose speed may be manually or automatically regulated to inject the desired proportion of cooled recirculated exhaust gas.

Under some operating conditions, for example operation in excessively dry hot climates, it may be desirable to introduce additional moisture in the form of steam or water vapor into the portion of the exhaust gases which are drawn off through the pipe 21 and the heat exchanger 22. This steam or water vapor is introduced into the pipe 21 by means of the steam tube 26, and the control valve 27, the steam or water vapor being generated in any conventional form of steam or vapor generator (not shown), either independently heated, for example by electric current, or heated by the heat from the exhaust gases.

While a most important element of my invention is the control of the physical state of the water addition (fog) to the fuel system, it is also believed to be advantageous to include some of the exhaust gases for the catalytic effect which they contribute to the explosive combustion which occurs in the motor.

The motor is operated in the usual way except that a portion of the exhaust gases are returned to the fuel intake system after first being cooled in the heat exchanger 22 to a temperature below the dew point. Where necessary, because of the atmospheric conditions, the returned portion of the exhaust gas is humidified by steam or water vapor introduced into the pipe 21 prior to entry into the heat exchanger, so that the dew point may be certainly attained in the heat exchanger. Additionally or alternatively the fresh air entering the carburetion system may also be humidified, by introducing steam or water vapor through the tube 18.

Since the fuel and moisture requirements of the motor vary with the motor load, the main throttle valve 15 and the cooled return gas valve 28 are conveniently linked for simultaneous operation. The amount of added humidification, either at the return line intake 27 or at the humidification tube 21 for the new air supply may be regulated respectively by the valves 27 and 28, depending upon the atmospheric conditions, and the cooling temperature which may be attained in the heat exchanger.

My operating method is useful for both automotive or stationary internal combustion engines.

My invention, for example, may be utilized in the simple automotive type engine assembly shown in Figs. 2 to 4, where the heat exchanger consists of an air cooled radiator installed ahead of the conventional automobile radiator which cools the water in the water jacket of the engine to prevent its overheating. Referring to Fig. 2, an internal combustion motor of the reciprocative type is indicated at 30, including a fuel intake manifold 31, a carburetor 32 connected to said intake manifold, an air cooled radiator 33 connected to the water cooling jacket 35 of said motor by the hose connection 34, said radiator 33 being adapted to keep the motor cool by means of the atmospheric air which is forced through the radiator by the forward motion of the vehicle and an auxiliary fan (omitted for simplicity) in the conventional manner. The motor also includes an exhaust manifold 36 which is connected to a muffler 37 by an exhaust pipe 38 to the muffler, and an exhaust pipe extension 39 carrying the exhaust gases away from the vehicle on which the engine may be installed. A return gas pipe 40 is connected to the exhaust pipe extension 39 and is arranged to carry a regulated portion of the exhaust gases to an auxiliary radiator 41 which is preferably air cooled and is capable of cooling the recirculated exhaust gas portion to a temperature below the dew point of said gas. The cooled gas from the auxiliary radiator 41 is carried by the pipe 42 to the intake manifold 31, there being a valve 43 to control the amount of cooled exhaust gas which is returned to the fuel system. There is also provided a steam generator 44 arranged around the hottest portion exhaust pipe 38 adjacent the exhaust manifold 36, so that liquid water from the tank 45 may be generated in the generator, the amount of water sprayed onto the hot exhaust pipe by the nozzle 49 being regulated by the water valve 46, and the steam so generated being introduced through the steam pipe 47 into the return gas pipe 40 intermediate the auxiliary radiator 41 and the connection to the exhaust pipe extension 39.

In operating my improved motor combination, the engine may be initially operated in the usual manner until heated. A portion of the exhaust gases is then withdrawn from the exhaust pipe extension, the volume of the gas being regulated by the butterfly valve 43 which may be operatively linked to the carburetor throttle valve 48. The motion of the vehicle on which the system is installed causes air flow cooling in the auxiliary radiator 41 (as well as the regular radiator 33) to cool the returned exhaust gas to a temperature below the dew point. The cooled gas and the fog of water particles is then introduced into the fuel charge at the fuel intake manifold 31 through the butterfly valve 43. If the atmospheric conditions are such that the dew point cannot be always attained in the air cooled auxiliary radiator 41, then, alternatively, moisture in the form of separately generated steam may be introduced into that portion of the exhaust gases which is returned, prior to the cooling in the auxiliary radiator. By thus increasing the total moisture content of the exhaust gas which is being re-circulated, the dew point is attained at a higher temperature produced in the auxiliary radiator than would be possible if the extra humidification was not employed.

If there are conditions, for example such as freezing temperatures, when it is not necessary to have full cooling means for the portion of the exhaust gases which are returned, in order to produce the required fog, the returned gases may at least in part be diverted from the auxiliary radiator 41 by means of a bypass valve 50 which directs a portion of the flow of exhaust gas directly to the valve 43 without cooling. The operation of the bypass valve may be manual, as by means of the operating lever 51. Closing vanes 53 may also be employed in front of the auxiliary radiator 41 to prevent freezing of the fogged water in the returned exhaust gas.

The advantages of my invention will be understood from the above description. My invention takes advantage of the commonly observed improvement in the operation of automotive or internal combustion engines in foggy weather, during which air dispersed liquid water droplets or fog enters through the carburetor. In addition to this observed improvement in the operation of the motor by fog, my method of operation also re-introduces some of the combustion gases chilled to below dew point which are believed to have a catalytic effect upon the combustion within the motor, causing decreased detonation and generally improved motor operation. By my invention the humidification and cooling of the return exhaust gases to a temperature below the dew point whereby fog is produced permits the control of the combustion or explosions in the engine so that maximum power is obtained under all conditions of operation.

I claim:

1. A motive power unit comprising in combination an internal combustion motor including a fuel intake manifold, an exhaust manifold, and an exhaust pipe; conduit means connected between said exhaust pipe and said intake manifold, adapted to withdraw a portion of the exhaust gases for return to said intake manifold; humidifying means for injecting water vapor into said conduit means; and heat exchange means adequate in capacity for cooling said withdrawn portion of the exhaust gases plus said injected water vapor to a temperature below the dew point to produce dispersed liquid water, said heat exchange means being disposed intermediate said humidifying means and said intake manifold.

2. A motive power unit comprising in combination an internal combustion motor including a fuel intake manifold, a carburetor, an exhaust manifold, and an exhaust pipe; means operatively connected to said carburetor to increase the content of water in the fuel charge going to said motor; conduit means connected between said exhaust pipe and said intake manifold adapted to withdraw a portion of the exhaust gases for return to said intake manifold; humidifying means for injecting water vapor into said conduit means; and heat exchange means for cooling said withdrawn portion of the exhaust gases plus said injected water vapor to a temperature below the dew point to produce dispersed liquid, said heat exchange means being disposed intermediate said intake manifold and said humidifying means.

3. An automobile engine comprising in combination an internal combustion motor including a fuel intake manifold, a carburetor, an air-cooled radiator connected to the water cooling jacket for said motor, an exhaust manifold, an exhaust pipe, a muffler, and an exhaust pipe extension; conduit means connected between said exhaust pipe extension and said intake manifold adapted to withdraw a portion of the exhaust gases for return to said intake manifold; humidifying means for generating and introducing water vapor into said conduit means; auxiliary air cooled radiator means for cooling said withdrawn portion of the exhaust gases plus added water vapor to a temperature below the dew point, said auxiliary radiator being disposed ahead of said motor cooling radiator, and connected in said conduit intermediate said humidifying means and said intake manifold.

4. An automobile engine comprising in combination an internal combustion motor including a fuel intake manifold, a carburetor, an air-cooled radiator connected to the water cooling jacket for said motor, an exhaust manifold, an exhaust pipe, a muffler, and an exhaust pipe extension; means operatively connected to said carburetor to increase the water vapor in the fuel charge going to said motor; conduit means connected between said exhaust pipe extension and said intake manifold adapted to withdraw a portion of the exhaust gases for return to said intake manifold; humidifying means for generating and introducing water vapor into said conduit means; auxiliary air cooled radiator means for cooling said withdrawn portion of the exhaust gases and said added water vapor to a temperature below the dew point, said auxiliary radiator being disposed ahead of said motor cooling radiator, and connected in said conduit intermediate said humidifying means and said intake manifold.

References Cited in the file of this patent

UNITED STATES PATENTS

| | | |
|---|---|---|
| 2,325,543 | Redinger | July 27, 1943 |
| 2,408,846 | Golden et al. | Oct. 8, 1946 |
| 2,419,747 | Wassman | Apr. 29, 1947 |
| 2,637,307 | Cushman | May 5, 1953 |
| 2,701,556 | Woerner | Feb. 8, 1955 |
| 2,737,936 | Clarke | Mar. 13, 1956 |